United States Patent [19]

Marchessault et al.

[11] 3,926,717

[45] Dec. 16, 1975

[54] PROCESS FOR FORMING A POLYMERIC FILM INSIDE A CELLULOSIC MATRIX AND PRODUCT OBTAINED THEREFROM

[75] Inventors: Robert H. Marchessault, Mount Royal; Bohuslav Fisa, Montreal, both of Canada

[73] Assignee: Her Majesty, The Queen, in Right of Canada, as represented by the Minister of Nat. Defence

[22] Filed: Oct. 29, 1973

[21] Appl. No.: 410,560

[30] Foreign Application Priority Data
Jan. 22, 1973  Canada.............................. 162457

[52] U.S. Cl.............................. 162/157 C; 162/184
[51] Int. Cl.²......................................... D21F 11/00
[58] Field of Search.... 162/182, 169, 157 C, 157 R, 162/184

[56] References Cited
UNITED STATES PATENTS

| | | | |
|---|---|---|---|
| 3,121,658 | 2/1964 | Orsino et al. .................... | 162/157 C |
| 3,503,785 | 3/1970 | Kruse................................. | 162/169 |
| 3,533,725 | 10/1970 | Bridgeford ...................... | 162/157 C |

*Primary Examiner*—S. Leon Bashore
*Assistant Examiner*—Peter Chin
*Attorney, Agent, or Firm*—Cushman, Darby & Cushman

[57] ABSTRACT

There is provided a shaped fibrous cellulosic material having a polymeric matrix deposited inside the original matrix. The polymer forms a "morphology-continuous" matrix which is complementary in shape with the original. The process involves the formation of a Ziegler-Natta catalyst inside the fiber matrix by depositing one element of a catalyst component selected from a transition metal catalyst or an organo-metallic compound in a hydrocarbon solvent having a vapor pressure higher than that of the selected catalyst component. The first catalyst component is then reacted with the second catalyst component to form a Ziegler-Natta catalyst and an l-olefin monomer is then polymerized to form a continuous polymeric film inside the shaped fibrous cellulosic matrix. Amongst the advantages there may be mentioned that the catalyst generation is greatly simplified and a superior product is obtained.

13 Claims, No Drawings

PROCESS FOR FORMING A POLYMERIC FILM INSIDE A CELLULOSIC MATRIX AND PRODUCT OBTAINED THEREFROM

The present invention relates to a novel fibrous cellulosic matrix having deposited therein a complementary matrix of a polymer which is continuous and preferentially surrounds and encapsulates the non-bonded portions of fibers.

PRIOR ART

The admixture of synthetic polymeric materials and cellulosic systems is well known. The most common type of process is one of coating which is an essential part of the Pulp and Paper and Cellophane Industries. The purpose of a coating is manyfold: to obtain heat-sealing properties, as a moisture barrier, to obtain desirable printing characteristics, to obtain opacity, etc.

Some years ago, new methods of admixing synthetic polymers with cellulosic materials started to make their appearance. In general, these methods involved direct polymerization of the monomer on the cellulosic substrate and association of the new polymer chains among themselves depending on the manner in which the polymerization was achieved. For example, when a cellulosic material was put in contact with a substance which generates free radicals inside its microscopic domain with monomer present then "polymerization in situ" occurred and an intimate contact between the synthetic polymer and the substrate was achieved, far greater than is possible by a coating process. Furthermore, certain polymers which do not lend themselves to coating technology are brought into intimate contact with substrate by this approach.

A second method which has received some attention involves the principle of "interfacial polymerization" which is used as a method of generating condensation polymers based on the mutual insolubility of certain diacylchlorides and diamines which nevertheless will polymerize at their interface. This approach has been used on paper the latter having been dipped in the diamine and subsequently passed into a bath containing the diacylchloride. This method of coating like the classical solvent or melt-coating processes tends to greatly diminish the porous character of the paper.

Still another method of depositing synthetic polymer on cellulosics involves a process which can be termed encapsulation. This basic idea stems from U.S. Pat. No. 3,121,698 J. A. Orsino, et al., Feb. 18, 1964 wherein a transition metal catalyst is deposited on the surface of cellulosic fibers activated with an organometallic reagent which will polymerize an olefin to form a polymer which is formed almost exclusively at and on the surface of the fibers. Using this process, individual fibers are coated with polyethylene or polypropylene or other polyolefins which correspond to the transition metal type of polymerization catalyst. An important feature of the process which assures its success is the fundamental affinity of transition metal halides for cellulosic substrate. This is true whether the transition metal is adsorbed molecularly or whether a transition metal catalyst (Ziegler-Natta type) is formed in suspension in a hydrocarbon solvent and subsequently adsorbed at the surface of the cellulosic fibers. In commercial applications, this process is used predominantly to encapsulate individual pulp fibers with polyethylene and these are subsequently formed on a paper-like matrix using conventional papermaking techniques. The important advantage of this approach is that it achieves simultaneous polymerization and fiber-forming of a polyolefin-like fiber the fibers being of the same dimensions as conventional papermaking fibers and therefore usable in terms of conventional papermaking technology. The coating of polyethylene around each fiber allows one to use the basic principle of thermoplastic bonding to achieve cohesion between fibers and this allows much more fabricating flexibility than when one depends on the usual interfiber bridges between pulp fibers which must be formed in the presence of water.

The fundamental disadvantage of the existing process is that the catalyst is formed in suspension and subsequently adsorbs as a colloidal particle onto the fiber surface. Using this type of catalyst, it is impossible to achieve a uniform deposition throughout a fibrous matrix since the polymerization catalyst particles so generated are generally large compared to the pores in the matrix which gives mainly a surface coating. Furthermore this process of fiber coating is adapted to treat cellulose in the form of fine powder, fibers or filaments of the type used in textiles, or paper pulp fibers to be used after encapsulation in the papermaking industry. On the other hand if the fibers are long fibers, such as Kraft, precautions must be taken since there is a tendency of the fibers to break up during treatment.

Accordingly it would appear highly desirable to obtain a process which would overcome the degradative effects of prolonged cellulose-catalyst contact and which would be suitable for fibrous matrixes.

THE INVENTION

In accordance with the present invention, there is provided a method whereby an inherently water-absorbing shaped fibrous cellulosic matrix can be rendered water-resistant or water-repellant by generating a continuous hydrophobic complementary polymeric matrix at the interior of the fibrous cellulosic matrix. The new hydrophobic polymeric matrix is formed inside the original matrix by producing inside the fibrous cellulosic matrix a polymerization catalyst and subsequently causing an olefin monomer to polymerize inside the matrix forming a "morphology-continuous" matrix which is complementary in shape with the original. This means that a fibrous element of the original matrix gives rise to a complementary unit having the same shape and configuration as the original fiber element. This process renders the original fiber matrix water-resistant or water-repellant. The polymerization catalyst is deposited inside the matrix by first treating the fibrous cellulosic matrix with a solution of a transition metal compound, evaporating the solvent and causing the transition metal compound to react with an organometallic compound to form an insoluble polymerization catalyst inside the matrix. An olefin monomer is then brought into contact with the matrix containing the polymerization catalyst thereby causing polymerization of the olefin monomer whereby there is formed a continuous polymeric matrix inside the original matrix which renders the latter water-resistant or water-repellant.

It is to be noted that the sequence of catalyst addition can be reversed i.e. the organometallic compound may be deposited first.

Also in accordance with the present invention, there is also provided a fibrous cellulosic matrix characterized by having a continuous and papillary coating of a polymer throughout the interstitial spaces of the fibrous matrix as opposed to prior art products wherein each individual cellulosic particle, fiber of filament is encased in a shell of polymeric material that is chemically or physically bonded thereto or both.

The complementary polymeric matrix is not visibly distinguishable from the cellulosic matrix but is chemically separable therefrom.

The fibrous cellulosic material which can be used in accordance with the present invention comprises paper products of all sorts, non-woven cellulosic fibrous products such as baby diapers, paper towels, facial tissues, coverings for sanitary napkins, paper garments such as panties, hospital bed sheets and pillow cases. Also suitable and included in the term cellulosic material are wood pulp fibers, stapel fibers such as cotton or web structures such as textiles.

The polymerization catalyst is obtained by the 'in situ' reaction of a transition metal compound with an organometallic compound. The transition metal compounds which can be used are of the Ziegler type catalyst such as titanium or vanadium halides, alkyl halides, alkyl esters or oxychlorides. As suitable transition metal compounds there may be mentioned vanadium tetrachloride, titanium tetrachloride, vanadium oxytrichloride, transition metal alkyl esters having the formula $M(OR)_4$ where M is a transition metal such as titanium or vanadium, R is lower alkyl. The organometallic compounds which can be used are the metal alkyls or related compounds and metal alkyl halides or hydrides of Group I–III in the periodic table such as lithium, sodium, potassium, magnesium, calcium, zinc, cadmium or aluminum. As a preferred organometallic compound there may be mentioned triethylaluminum.

In order to obtain a suitable polymerization catalyst the transition metal and organometallic compounds are used in the usual amounts required to form a Ziegler-Natta catalyst.

It is obvious that the usual precautions required to be taken when working with Ziegler-Natta catalysts must be observed. Thus the moisture level of the substrate must be controlled for optimum results with a moisture not exceeding 0.1% being preferred and steps must be taken to exclude oxygen from the system.

The process of the present invention provides for direct deposit of the transition metal compound inside the cellulosic matrix prior to the generation of the polymerization catalyst. This is in contrast to the prior art procedures wherein the transition metal catalyst was performed before being deposited on the surface of fibers by the use of a suspension of the said transition metal compound with organometallic prior to deposition.

A novel feature of the present invention is in depositing the transition metal inside the fibrous matrix by the use of volatile hydrocarbon solvents having a vapor pressure higher than that of the selected catalyst component. When the solvent has a higher vapor pressure than that of the selected catalyst component, the solvent will readily evaporate leaving the catalyst component as a deposit inside the fibrous matrix.

As an example of suitable solvents there may be mentioned such low boiling liquids or liquified gases as 2-methylbutane, butane, propane, isopentane, pentane and certain halogenated hydrocarbons such as ethyl chloride. Dipping of the cellulosic matrix in a hydrocarbon solvent containing one catalyst component and subsequent passage into an evaporation zone results in a preferential removal of the hydrocarbon solvent leaving behind finely dispersed catalyst component in solid or liquid form inside the cellulosic matrix. The cellulosic matrix is then brought into contact with the other catalyst component either in solution or vapor form thus forming the Ziegler-Natta polymerization catalyst throughout the matrix in finely dispersed form inside the cellulosic matrix.

The cellulosic matrix containing the Ziegler-Natta polymerization catalyst is then treated with an olefin monomer in the presence or absence of a solvent whereby a heterogenous polymerization of the monomer occurs uniformly within the cellulosic matrix. When a liquid medium is used for the polymerization, the solvent selected must be such as to allow local precipitation of the polymer formed simultaneously with polymerization.

As olefin monomer there may be used any of the aliphatic 1-olefins having less than 6 carbon atoms such as ethylene, propylene, butene-1 and the like and also di-olefins such as butadiene-1,3 and isoprene and finally all vinyl monomers which are suitable for polymerization with Ziegler-Natta catalysts, e.g. styrene or methyl methacrylate.

The presence of the complementary polymer matrix within the cellulosic matrix can be readily evidenced by treating the matrix with a solvent which will dissolve the cellulosic matrix while not dissolving the polymer. For example, paper treated in accordance with the present invention will dissolve when placed in sulfuric acid leaving a thin continuous matrix of the polymer of the same size as the sheet of paper which was treated. The lowest level of polyethylene add-on which produces this phenomenon is about 5% to obtain a continuous matrix.

Microscopic examination of the paper-polyolefin composite shows that the polyolefin polymerization has proceeded in such a way as to form essentially a continuous replica of the paper matrix. Individual fibers of cellulose, where they were not in contact with each other, were completely encapsulated with polyolefin so that the resulting structure maintains a paper-like appearance, "hand", and properties but with certain enhanced characteristics. Among these, one may mention: water impermeability, improved wet-strength, increased opacity, maintained air permeability although somewhat modified in a direction of decreasing this characteristic.

When conventional papermaking properties are measured for a paper substrate, which had been treated by the above process to achieve polyethylene add-on of between zero and 27%, it was found that wet-strength, toughness and breaking elongation increased while breaking length, on a conventional "basis weight" scale, remained approximately constant. It should be noted that the actual breaking load of the treated paper increased in proportion to the added polyethylene. In the case of untreated bleached paper, it is found that after treatment in accordance with the present invention opacity is increased while brightness and visual efficiency were unchanged. On the other hand when unbleached paper such as brown Kraft paper is treated in accordance with the present invention a marked increased in brightness is observed. The data in Table 1 are typical results obtained when a conventional filter paper was used as cellulosic substrate in the above described process.

Compared to the existing process, the procedure of the present invention is particularly suitable for a continuous process and has the following specific advantages:

Catalyst generation is greatly simplified and accelerated to a matter of seconds which implies that the danger of physical damage to the cellulose fibers due to contact with the catalyst components is greatly decreased.

Yields of polymer and speed of polymerization are considerably increased.

The texture of the deposited polymerization catalyst is more uniform (finer grained) so that the resulting polymer provides a smoother coating around each fiber even inside the paper matrix.

This process is such that it allows encapsulation of the entire cellulosic matrix without disrupting the pre-existing interfiber bonds.

This process does not involve a lengthy azeotroping for water removal.

The present invention will be more fully understood by referring to the following Examples.

EXAMPLE 1

A previously dried sheet of Schleicher & Schuell filter paper No. 595 is dipped in the 0.01 M solution of $TiCl_4$ in 2-methylbutane and removed immediately. The 2-methylbutane is allowed to evaporate (25–30 seconds under the conditions used).

The paper is then treated for a short time with a solution of $Al(C_2H_5)_3$ in n-heptane. The polymerization is carried out in the 0.02 M solution of $Al(C_2H_5)_3$ in n-heptane through which ethylene is bubbled. Polymerization starts instantaneously and the following weight increase was recorded as a function of time (Table 2) after the paper was removed from the dry box where all previous operations (except drying) were performed. Prior to determining the polyethylene "add-on" the paper was treated with dilute HCl solution (0.1 M) in methanol, in order to remove the catalyst, followed by an acid neutralizing treatment with $NH_4OH$ dissolved in methanol. Other methods of destroying the residual catalyst are e.g. boiling water, the latter approach is less damaging to the cellulose fibers.

TABLE 1

Properties of Filter Paper Encapsulated with Polyethylene

|  | Un-treated | 4% "add-on" | 27% "add-on" |
|---|---|---|---|
| Thickness (mm) | 0.177 | 0.192 | 0.236 |
| Breaking length (m) | 3589 | 3640 | 3580 |
| Breaking elongation (%) | 2.1 | 2.5 | 3.25 |
| Toughness (g. cm) | 510 | 584 | 823 |
| Tear factor (g) | 102 | 105 | 118 |
| Wet strength (% dry strength) | 25% | 50% | 75% |
| Double folds MIT | 30 | 25 | 100 |
| Air resistance (seconds) | 1.1 | 2.5 | 18.0 |
| Brightness (%) | 92.2 | 91.5 | 92.8 |
| Visual efficiency (%) | 94.2 | 94.7 | 96.1 |
| TAPPI opacity (%) | 80.5 | 84.1 | 90.8 |
| Printing opacity (%) | 83.6 | 87.1 | 93.5 |

TABLE 2

Increase in Weight of Filter Paper after Various Times of Polymerization of Ethylene

| Time (seconds) | % by Weight "add-on" |
|---|---|
| 15 | 1.7 % |
| 30 | 3.0 % |
| 200 | 16.7 % |
| 500 | 22.6 % |
| 1000 | 27.6 % |

TABLE 2-continued

Increase in Weight of Filter Paper after Various Times of Polymerization of Ethylene

| Time (seconds) | % by Weight "add-on" |
|---|---|
| 3600 | 64.5 % |

EXAMPLE 2

A previously dried cotton fabric (U.S. Army "greige" fabric) was treated by $TiCl_4$, $Al(C_2H_5)_3$, ethylene, HCl and an acid neutralizing substance, as described in Example 1, and the weight increase was recorded as function of time (Table 3).

TABLE 3

Increase in Weight of Cotton Fabric after Various Times of Polymerization of Ethylene

| Time (seconds) | % by Weight "add-on" |
|---|---|
| 20 | 1.7 % |
| 40 | 2.1 % |
| 150 | 4.7 % |
| 250 | 6.7 % |

The resulting fabric was waterproof yet retained a textile "hand" and microporous character ("breathability"). Its "brightness" was increased and no deleterious effects to mechanical properties were noted.

EXAMPLE 3

A previously dried non-woven fabric (50% Rayon staple, 50% paper pulp fiber, basis weight 70 g/sq. yd) was treated with $TiCl_4$ (0.014 M solution in 2-methylbutane). Organometallic compound, ethylene, HCl and acid neutralizing substance as described in Example 1, except that a 0.024 M solution of butyllithium in heptane was used instead of triethylaluminum solution. After 300 seconds of polymerization, a 3% weight increase due to formation of polyethylene, was recorded.

EXAMPLE 4

Treatment of a non-woven fabric was performed exactly as in Example 3 except that diethylaluminum chloride (0.029 M solution in n-heptane) was used as organometallic compound. After 300 secs. of polymerization, a 4% weight increase due to formation of polyethylene, was recorded.

EXAMPLE 5

A previously dried sheet of Schleicher & Schuell filter paper (No. 595) was treated as described in Example 1 except that instead of 0.01 M solution of $TiCl_4$, a 0.014 M solution of $VCl_4$ was used. After 300 seconds of polymerization, a 10% weight increase due to formation of polyethylene, was recorded.

EXAMPLE 6

A previously dried sheet of Schleicher & Schuell filter paper (No. 595) was dipped in the 0.018 M solution of triisobutylaluminum in 2-methylbutane and removed immediately. The paper was then treated for a short time with a 0.025 M solution of $VCl_4$ in n-heptane. The polymerization was performed in the 0.025 M solution in n-heptane. After 300 seconds of polymerization followed by treatment in order to remove the catalyst as described in Example 1, a 3% weight increase due to formation of polyethylene was recorded.

EXAMPLE 7

Several types of commercial papers were treated with $TiCl_4$ (0.029 M solution in 2-methylbutane), aluminum triethyl (0.02 M), ethylene, HCl and an acid neutralizing substance as described in Example 1 and after 1000 seconds of polymerization, the following weight increases due to formation of polyethylene were recorded:

| | |
|---|---|
| Eastern Kraft Softwood | 20.5% |
| Unbleached Semichemical Hardwood | 17.7% |
| Groundwood (Spruce) | 16.0% |
| 75% Groundwood 25% Unbleached Eastern Sulphite | 43% |
| Woodfree Register Stock | 6.2% |
| No. 1 Kraft Carbonizing | 5.4% |
| Multiwall Bag | 22.1% |
| Interleaving | 25.7% |
| Linerboard | 14% |
| Corrugating Medium | 22% |
| Cigarette Tissue | 26% |
| Cable Insulating | 13% |
| 100% Cotton fiber paper | 104% |

All samples were visibly improved in brightness and this property improvement was particularly noticeable with samples made of unbleached pulp containing more than ten percent polyethylene.

EXAMPLE 8

Graphitized rayon textile (99.9 pure graphite) in Example 7 and after 300 seconds of polymerization, a 12% weight increase was recorded. The jet black color of the material was now a light grey and although the major part of the polyethylene was at the surface of the cloth, the adhesion of the nascent polymer was strong and at least in part a complementary continuous matrix was formed.

EXAMPLE 9

Unbleached Kraft Hardwood paper was treated with 0.02 M $TiCl_4$ solution in 2-methylbutane and 0.02 M solution of $Al(C_2H_5)_3$ in heptane. Polymerization was carried out in a 0.02 M solution of $Al(C_2H_5)_3$ in heptane through which propylene was bubbled. After 1000 seconds of polymerization 1.2% weight increase due to polypropylene was recorded.

The embodiments of the invention in which an exclusive property or privilege is claimed are defined as follows:

1. A process for preparing a shaped fibrous cellulosic material having deposited therein a complementary matrix of a polymer which is continuous and preferentially surrounds the non-bonded portions of fibers which comprises forming a two component organometallic-transition metal catalyst system by treating a fibrous cellulosic matrix with a catalyst component selected from a transition metal or an organometallic compound in a hydrocarbon solvent having a vapor pressure higher than that of the selected catalyst component, evaporating the solvent thereby to cause a deposit of the selected catalyst component inside the matrix, reacting said selected catalyst component with the other catalyst component to form an organometallic-transition metal polymerization catalyst inside the matrix and treating said matrix containing the polymerization catalyst with a monomer which is an aliphatic 1-olefin monomer having less than 6 carbon atoms, methyl methacrylate or styrene to form a continuous complementary polymeric matrix inside the shaped fibrous cellulosic matrix, the product formed being characterized by having a continuous and papillary coating of said polymeric matrix throughout the interstitial spaces of the fiberous cellulose matrix.

2. A process according to claim 1, wherein the monomer is an aliphatic 1-olefin having less than 6 carbon atoms.

3. A process according to claim 2, wherein the monomer is a monoolefin having less than 6 carbon atoms.

4. A process according to claim 2, wherein the monomer is a diolefin having less than 6 carbon atoms.

5. A process according to claim 2, wherein the transition metal catalyst is selected from the group consisting of halides, alkyl halides, alkyl esters and oxyhalides of a transition metal and the organometallic reagent is selected from alkyl and aryl compounds of one of the metals: lithium, sodium, potassium, magnesium, calcium, zinc, cadmium and aluminum.

6. The process of claim 5 wherein the first catalyst component deposited inside the matrix is a transition metal compound.

7. The process of claim 5 wherein the first catalyst component deposited inside the matrix is an organometallic compound.

8. A shaped, fibrous, cellulosic matrix having a continuous complementary polymer matrix distributed inside said cellulosic matrix in the interstitial spaces thereof conforming substantially to the internal and external shape of said cellulosic matrix and surrounding the non-bonded portions of the fibers constituting the cellulosic matrix whereby the original interfiber bonding of the cellulosic matrix is retained, said complementary polymer matrix not being visibly distinguishable but chemically separable from the cellulosic matrix and said polymer being a polymerized aliphatic 1-olefin monomer having less than six carbon atoms.

9. A product as in claim 8, wherein the polymer is polyethylene.

10. A product as in claim 8, wherein the polymer is polypropylene.

11. A product comprising a shaped, fibrous, cellulosic matrix of unbleached paper having in the interstitial spaces thereof a continuous complementary polymer matrix consisting of a polymerized aliphatic 1-olefin monomer having less than six carbon atoms, said polymer matrix being distributed inside and outside said cellulosic matrix and conforming substantially to the shape of said cellulosic matrix, said polymer matrix surrounding the non-bonded portions of the fibers constituting the cellulosic matrix, whereby the original interfiber bonding of said cellulosic matrix is retained, and wherein said complementary polymer matrix provides an improved brightness to the unbleached paper.

12. The product of claim 11, wherein the polymer is polyethylene.

13. The product of claim 11, wherein the polymer is polypropylene.

* * * * *